(12) United States Patent
Spies et al.

(10) Patent No.: US 7,226,128 B2
(45) Date of Patent: Jun. 5, 2007

(54) VEHICLE SEAT WITH FLOOR POSITION

(75) Inventors: Eckhard Spies, Enkenbach-Alsenborn (DE); Jörg Adam, Oberreidenbach (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 11 days.

(21) Appl. No.: 11/305,940

(22) Filed: Dec. 19, 2005

(65) Prior Publication Data

US 2006/0163926 A1 Jul. 27, 2006

(30) Foreign Application Priority Data

Jan. 25, 2005 (DE) .................. 10 2005 003 289

(51) Int. Cl.
*B60N 2/20* (2006.01)
(52) U.S. Cl. ............... 297/341; 297/378.12; 296/65.09
(58) Field of Classification Search .............. 297/15, 297/331, 334, 341, 378.12; 248/429, 430, 248/421, 422; 296/65.01, 65.09
See application file for complete search history.

(56) References Cited

U.S. PATENT DOCUMENTS

| | | | | |
|---|---|---|---|---|
| 4,805,953 A | * | 2/1989 | Yamauchi | ............... 296/65.09 |
| 5,570,931 A | * | 11/1996 | Kargilis et al. | ......... 297/378.12 |
| 5,588,707 A | * | 12/1996 | Bolsworth et al. | ...... 297/378.12 |
| 6,000,742 A | * | 12/1999 | Schaefer et al. | ......... 296/65.09 |
| 6,123,380 A | * | 9/2000 | Sturt et al. | ............... 296/65.09 |
| 6,520,581 B1 | * | 2/2003 | Tame | .......................... 297/336 |
| 6,902,236 B2 | * | 6/2005 | Tame | .......................... 297/335 |
| 2004/0108765 A1 | | 6/2004 | Habedank | |

FOREIGN PATENT DOCUMENTS

DE 196 16 070 A1 11/1997
DE 102 56 514 A1 6/2004

* cited by examiner

*Primary Examiner*—Peter R. Brown
(74) *Attorney, Agent, or Firm*—Womble Carlyle Sandridge & Rice, PLLC

(57) ABSTRACT

In the case of a vehicle seat (1) with a first seat rail (5), a second seat rail (8) which can be moved and locked relative to the first seat rail (5), by way of which the longitudinal seat position of the vehicle seat (1) can be adjusted, an adjustable fitting connected to the second seat rail (8), a seat back coupled by way of the fitting, and a seat cushion carrier (28) coupled to the second seat rail (8) by way of a pivotable support member (30), whereby the vehicle seat (1) can be can be converted from a use position by releasing the fitting and pivoting the seat back relative to the seat cushion carrier (28) to a floor position, a device (33) is provided which queries the relative position between pivotable support member (30) and second seat rail (8) and in dependency on that releases the seat rails (5, 8).

20 Claims, 3 Drawing Sheets

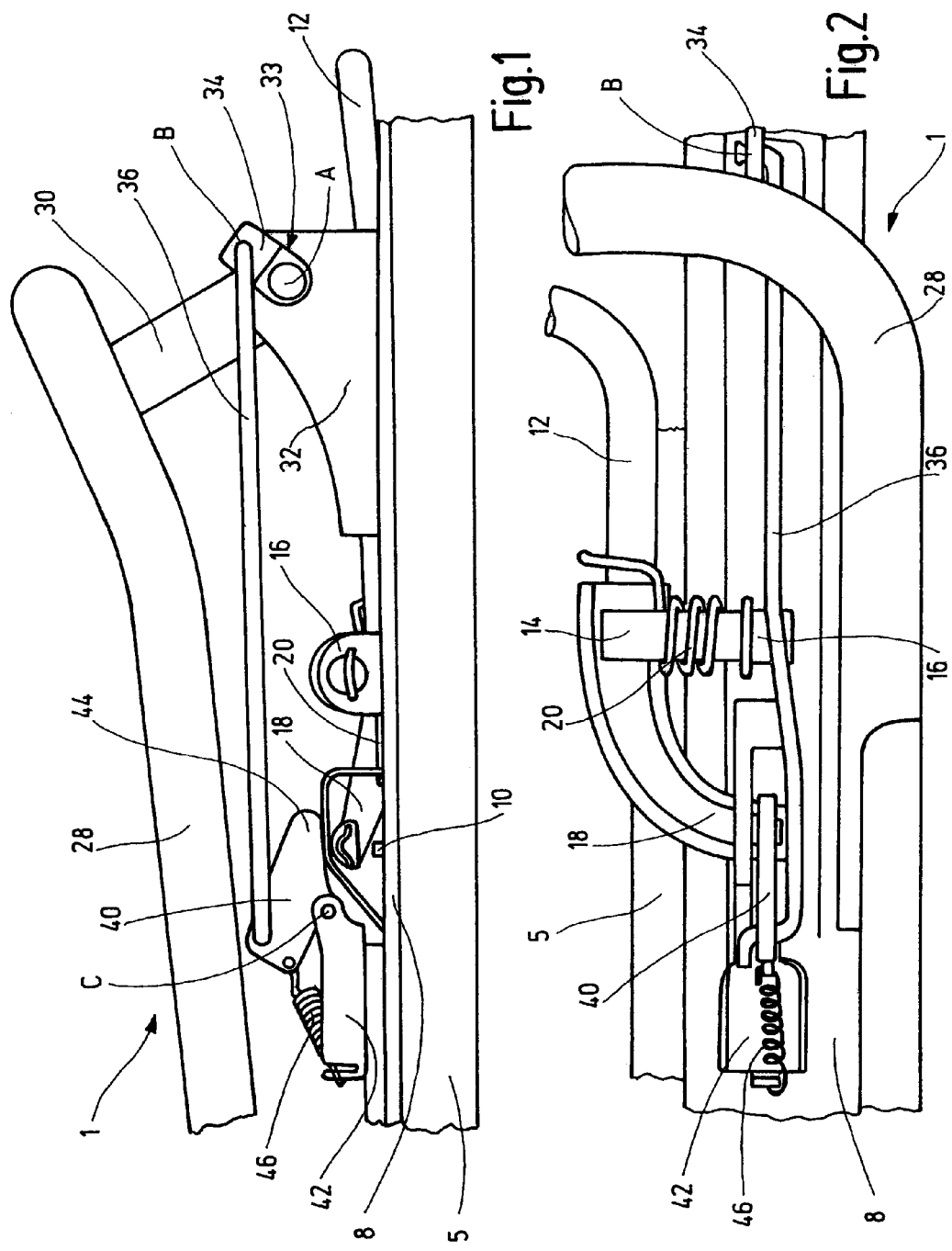

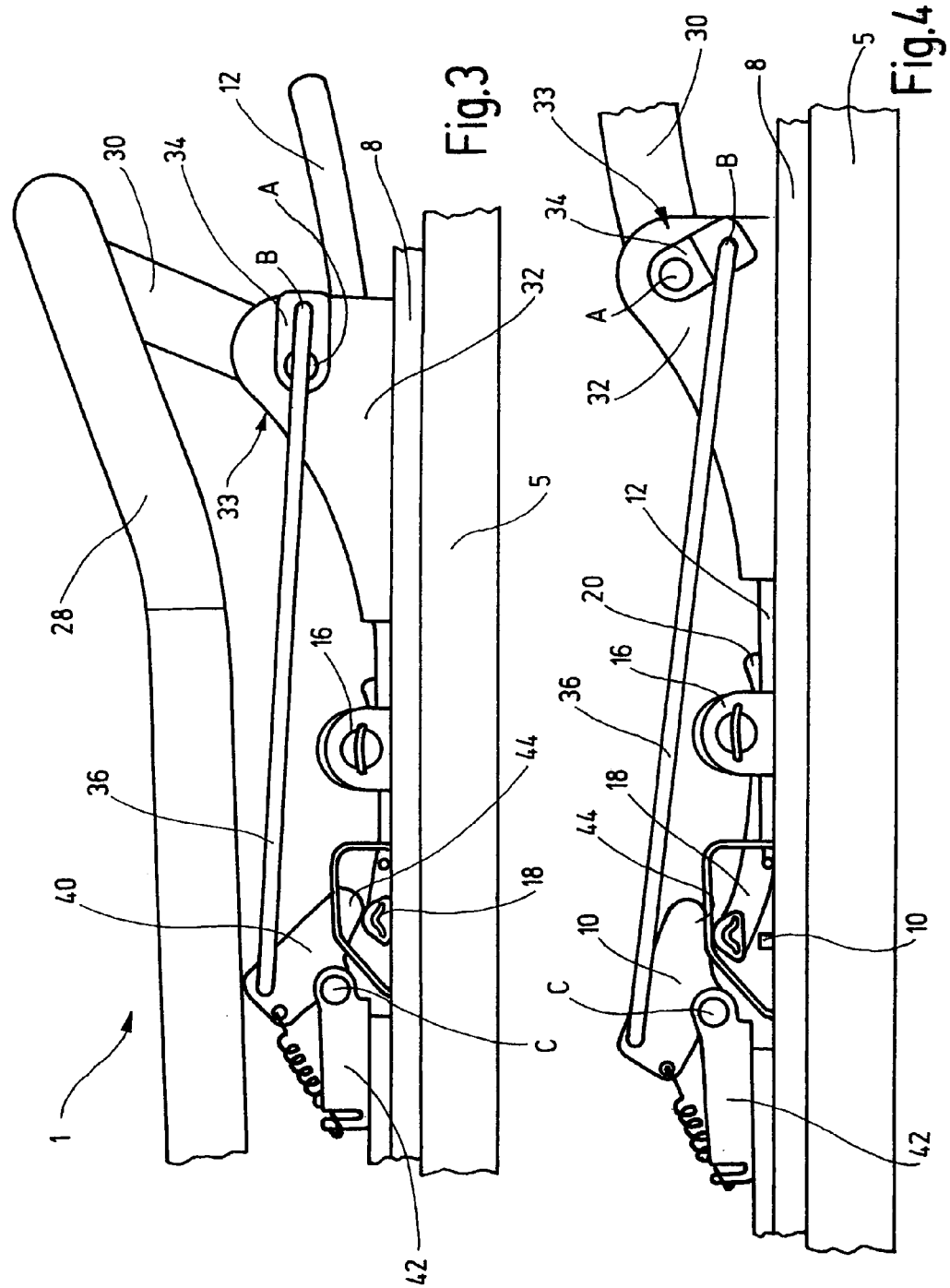

VEHICLE SEAT WITH FLOOR POSITION

RELATED APPLICATION

The present application claims priority to DE 10 2005 003 289.3, which was filed Jan. 25, 2005. The entire disclosure of DE 10 2005 003 289.3 is incorporated herein by reference.

BACKGROUND OF THE INVENTION

The present invention relates to a vehicle seat, in particular a motor vehicle seat, with at least one first seat rail, at least one second seat rail which can be moved and locked relative to the first seat rail for the purpose of adjusting and securing the longitudinal seat position of the vehicle seat, at least one adjustable fitting connected to the second seat rail, one seat back coupled by means of the fitting, and one seat cushion carrier coupled to the second seat rail by means of at least one pivotable support member, whereby the vehicle seat can be can be converted from a use position by releasing the fitting and pivoting the seat back relative to the seat cushion carrier to a floor position.

With known vehicle seats of the type described immediately above, there can be a problem in the case of a short distance between the rows of seats. The problem is that when pivoting the seat back forward, its head rest comes into contact with the seat row arranged in front, and thereby the seat back is prevented from reaching the floor position, or there are damages. The seat back must then be pivoted back again in order to remove the head rest.

BRIEF SUMMARY OF SOME ASPECTS OF THE INVENTION

In accordance with an embodiment of the present invention, a vehicle seat, such as a motor vehicle seat, includes at least one first seat rail; at least one second seat rail mounted for being moved relative to the first seat rail to adjust the vehicle seat's longitudinal position; and at least one locking device for restricting the second seat rail from being moved relative to the first seat rail while the locking device is locked, and allowing the second seat rail to be moved relative to the first seat rail while the locking device is unlocked. A seat cushion carrier and a seat back are mounted for moving with the second seat rail relative to the first seat rail. At least one adjustable fitting is operatively associated with the seat back so that the seat back can be pivoted relative to the seat cushion carrier between a plurality of positions. The plurality of positions at least includes a use position and a floor position. In the use position, the seat back extends at least generally upright so that a user can sit in the vehicle seat. In the floor position, the seat back extends at least generally horizontally. At least one pivotable support member is mounted for at least partially supporting the seat cushion carrier. The pivotable support member moves relative to the second seat rail and into a first predetermined position in response to the seat back being pivoted relative to the seat cushion carrier into a second predetermined position of the plurality of positions. A responsive device is provided for unlocking the locking device in response to the pivotable support member being moved into the second predetermined position relative to the second seat rail.

Because the responsive device queries the relative position between the pivotable support member and second seat rail and in dependency on this relative position unlocks the seat rails, in the transition from the use position to the floor position the seat rails can be unlocked so that a shifting of the vehicle seat is possible for correction of the distance to the front seat row. This can be advantageous, for example, when the transition to the floor position is restricted to the middle and rear longitudinal seat positions.

In accordance with an embodiment of the present invention, the responsive device can be in the form of a mechanical linkage that includes a motion transmitter (e.g., a device that queries the relative position between the pivotable support member and second seat rail), a release lever, and a pulling mechanism. Stated differently, to control the unlocking of the locking device, the motion transmitter can be connected by way of the pulling mechanism to the release lever, or a similar device, whose movement unlocks the locking device and thereby releases the seat rails.

In an embodiment in which the seat rails are released in the transition to the floor position, a structurally simple supplement of existing modules is possible, by having the release lever act upon a pivoting release arm. The release arm typically is already present by virtue of being associated with a release clip, which serves the purpose of a manual release of the seat rails.

As a motion transmitter which queries the progress of the transition to the floor position, a projection (or the pivotable support member itself) rotationally fixed to the pivotable support member can be provided. The projection rotates jointly with the pivotable support member around a pivotable axle. The angular position of the pivotable support member is then the queried measure. In a corresponding manner the angular position of a different component of the vehicle seat can be queried. The pulling mechanism is flexibly mounted to a mounting point of the projection spaced apart from the pivotable axle (or from the pivotable support member). For example, the pulling mechanism can be hingedly mounted, but it can also be rigidly mounted. In an intermediate position between the use position and the floor position, the movement of the projection reaches a dead center position at which the mounting point lies in front of the pivotable axle and the pulling mechanism extends across the pivotable axle. The pulling mechanism then experiences its greatest deflection and can activate the release lever.

It is also conceivable to couple the query of the projection with the release of the fitting.

Other aspects and advantages of the present invention will become apparent from the following.

BRIEF DESCRIPTION OF THE DRAWINGS

In the following, the invention is described in greater detail with reference to an exemplary embodiment shown in the drawings, in which:

FIG. 1 is a partial view of the exemplary embodiment without upholstery and in the use position of the vehicle seat;

FIG. 2 is a top view of the part shown in FIG. 1;

FIG. 3 is a partial view of the exemplary embodiment in an intermediate position of the vehicle seat;

FIG. 4 is a partial view of the exemplary embodiment without a seat cushion carrier and in the floor position of the vehicle seat;

DETAILED DESCRIPTION OF EXEMPLARY EMBODIMENT

Figure 5:
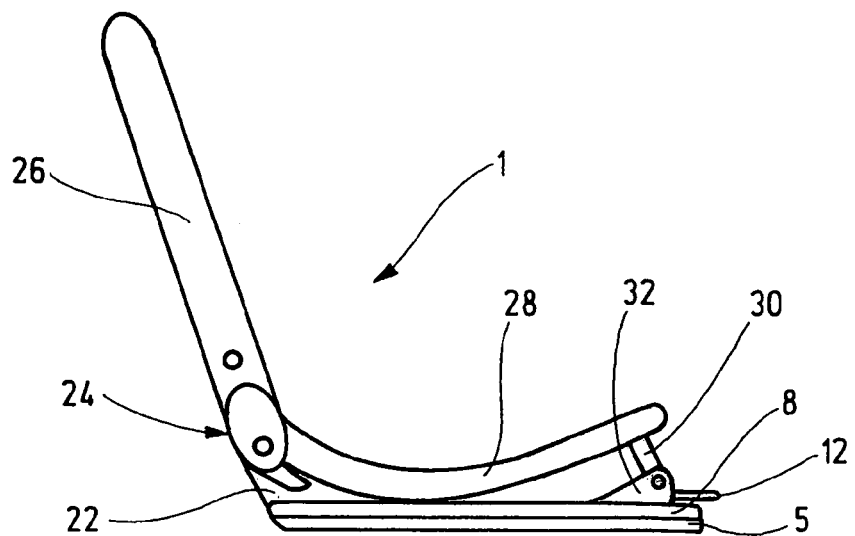
FIG. 5 is a side view of the exemplary embodiment without upholstery and in the use position of the vehicle seat.
Figure 6:
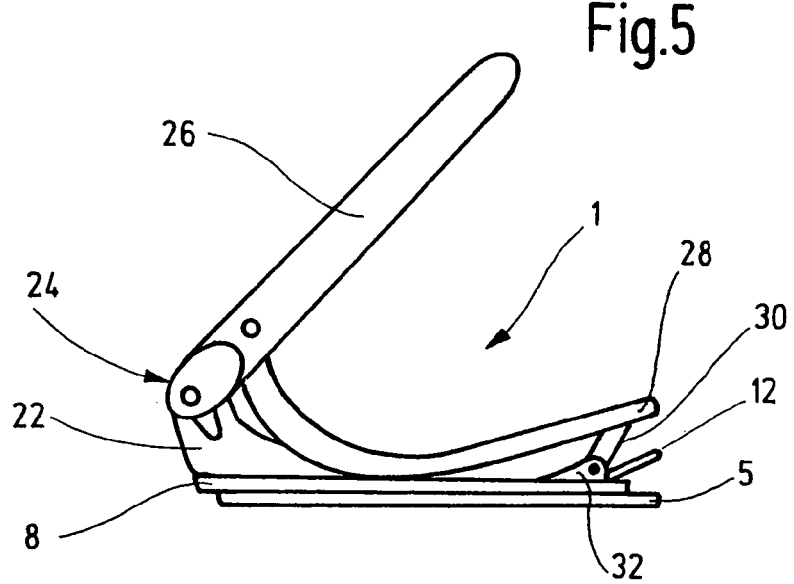
FIG. 6 is a side view of the exemplary embodiment in the intermediate position of the vehicle seat.
Figure 7:
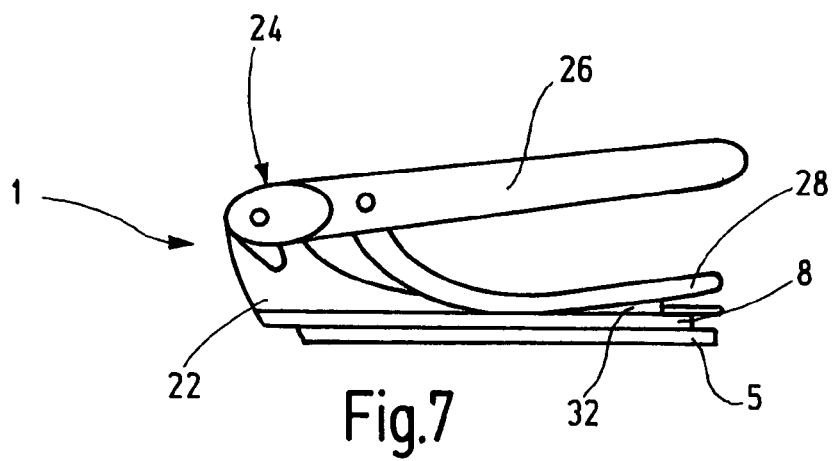
FIG. 7 is a side view of the exemplary embodiment in the floor position of the vehicle seat.

In accordance with the exemplary embodiment of the present invention, a vehicle seat 1 is provided for a rear seat row of a motor vehicle. In order to set the longitudinal seat position of the vehicle seat 1, both vehicle seat sides are provided with a pair of seat rails. Each pair of rails includes a first seat rail 5 and a second seat rail 8. For each pair, the first seat rail 5 is fixedly attached to structure of the vehicle, and the second seat rail 8 is fixedly attached to structure of the vehicle seat 1. The seat rails 5 and 8 of each pair mutually encompass each other so that the second seat rail 8 that is fixedly attached to, and carries, the vehicle seat 1 can be moved in a longitudinal direction relative to the first seat rail 5. The seat rails 5 and 8 can be locked together by means of a conventional locking device 10.

An approximately U-shaped release clip 12 is provided for the joint unlocking of both locking devices 10 (i.e., typically each pair of seat rails includes its own locking device 10). The release clip 12 is arranged so that the mid-section of the release clip 12 is accessible to the passengers at the front side of the vehicle seat 1. The mid-section of the release clip 12 is manipulated by a passenger for the purpose of manually unlocking the seat rails 5 and 8. In the region of each of the ends of the release clip 12, a transverse tube 14 protrudes laterally. Each transverse tube 14 is pivoted in a respective bearing device 16. Each bearing device 16 is mounted on its corresponding second seat rail 8. Each end of the release clip 12 is constructed as a laterally beveled release arm 18. Each release arm 18 ends above a bolt of the respective locking device 10. These bolts respectively project upwardly from the second seat rails 8. For each pair of seat rails, a retaining spring 20 that is coiled around the transverse tube 14 pretensions the release clip 12 away from the second seat rail 8 in such a way that the release arm 18 remains spaced apart from the bolt of the locking device 10, as a result of which the locking device 10 remains locked.

A rear adapter 22 is mounted at the rear end of each second seat rail 8. A conventional adjustable fitting 24 is fastened to each rear adapter 22, whereby the adjustable fittings 24 are respectively connected to the second seat rails 8. On each side of the vehicle seat 1, a seat back 26 is coupled to the rear adapters 22 by way of the fittings 24. The seat back 26 is arranged upright, more specifically inclined slightly to the rear, in the use position of the vehicle seat 1. Above the fitting 24, the rear end of a seat cushion carrier 28 is coupled to the seat back 26. On both sides, the front end of the seat cushion carrier 28 is pivotably coupled to an upper end of a pivotable support member 30. Each pivotable support member 30 is mounted for pivoting with a pivotable axle A. More specifically, each pivotable support member 30 is coupled with its lower end to an axle A, which in turn is coupled to a front adapter 32, which in turn is fastened on the front end of the respective second seat rail 8. The pivotable support member 30 is also slightly inclined to the rear in the use position of the vehicle seat 1.

In accordance with the exemplary embodiment of the present invention and generally described, a responsive device is provided for unlocking the locking device 10 in response to the pivotable support member 30 being moved into a predetermined position relative to the second seat rail 8; and the responsive device can be characterized as being, or including, a querying device that is provided for querying the relative position of the pivotable support member 30 to the second seat rail 8. As a more specific example, the responsive device can be in the form of a mechanical linkage that includes the querying device, with the querying device being in the form of a motion transmitter 33. That is, and in accordance with the exemplary embodiment of the present invention, the motion transmitter 33 is provided for querying the relative position of the pivotable support member 30 to the front adapter 32 and to the second seat rail 8. The motion transmitter 33 can be in the form of a projection 34. The projection 34 is arranged on the side of the front adapter 32 that faces away from the pivotable support member 30. The projection 34 is connected to the pivotable support member 30 in a rotationally fixed manner, for example by means of a bearing bolt (e.g., the pivotable axle A) of the pivotable support member 30.

As mentioned above, the responsive device (which is for unlocking the locking device 10 in response to the pivotable support member 30 being moved into a predetermined position relative to the second seat rail 8) can be in the form of a mechanical linkage, and this mechanical linkage can further include a pulling mechanism 36 and a release lever 40. In accordance with the exemplary embodiment, the pulling mechanism is flexibly (e.g., pivotably) mounted to a mounting point B of the projection 34. The mounting point B of the projection 34 is spaced apart from the pivotable axle A.

Further in accordance with the exemplary embodiment, the pulling mechanism 36 extends to the release lever 40, and the pulling mechanism 36 is flexibly (e.g., pivotably) mounted to the release lever 40. In accordance with the exemplary embodiment, the pulling mechanism 36 more specifically is a wire or rod that extends through an opening of the projection 34 at mounting point B, and that also extends through an opening of the release lever 40.

The release lever 40 is pivoted on a bearing bracket 42 by means of a bearing bolt defining a lever axle C. The bearing bracket 42 is fastened to the second seat rail 8. A release nose 44 is constructed on the release lever 40. The release nose 44 is arranged above the release arm 18. Additionally a pre-tensioned spring 46 is provided. One end of the pre-tensioned spring 46 is connected to the release lever 40, and the other end of the pre-tensioned spring 46 is connected to the bearing bracket 42. The release lever 40 is constructed as a two-arm lever. With regard to the lever axle C, the release nose 44 is provided on one lever arm and the connections of the pulling mechanism 36 and the pre-tensioned spring 46 are provided on the other lever arm. By means of the pre-tensioning of the pre-tensioned spring 46, the release lever 40 is acted upon in such a way that the release nose 44 is kept spaced apart from the release arm 18.

The vehicle seat 1 can be converted from the use position to a flat floor position. For this purpose, the fittings 24 are released and the seat back 26 is pivoted to the front. Due to the coupling by means of the seat cushion carrier 28, the pivotable support member 30 also pivots to the front, with which the seat cushion carrier 28 is lowered. In an alternative way of looking at things, the second seat rail 8, the pivotable support member 30, the seat cushion carrier 28 and the lower part of the seat back 26 together form a four-bar mechanism which collapses.

While the vehicle seat 1 is in its forward-most longitudinal seat position (e.g., as a result of the second seat rail 8 having been slid forwardly relative to the first seat rail 5), if the fittings 24 are released and the seat back 26 is pivoted to the front, the longitudinal seat position of the vehicle seat 1 typically should be re-adjustable during the pivoting to the front in order to prevent a contact of the seat back 26 and its head rest against the seat row arranged further in front. In response to the pivoting forward of the seat back 26 and the corresponding forward pivoting of the pivotable support members 30, on each side of the vehicle seat the projection 34 is turned. In the process, mounting point B moves forward, and the projection 34 acts upon the release lever 40 by means of the pulling mechanism 36. As a result, the release lever 40 pivots around the lever axle C against the pre-tensioning, so that the release nose 44 approaches the release arm 18 and finally acts upon the release arm 18. The release arm 18 then acts upon the bolt of the locking device 10, so that it unlocks and the second seat rail 8 is movable relative to the first the seat rail 5 (i.e., the longitudinal seat position of the vehicle seat 1 can be re-adjusted during the pivoting to the front in order to prevent a contact of the seat back 26 and its head rest against the seat row arranged further in front).

It will be understood by those skilled in the art that while the present invention has been discussed above with reference to exemplary embodiments, various additions, modifications and changes can be made thereto without departing from the spirit and scope of the invention as set forth in the following claims.

What is claimed is:

1. A vehicle seat, comprising:
   at least one first seat rail;
   at least one second seat rail mounted for being moved relative to the first seat rail to adjust the vehicle seat's longitudinal position;
   at least one locking device for
      (a) restricting the second seat rail from being moved relative to the first seat rail while the locking device is locked, and
      (b) allowing the second seat rail to be moved relative to the first seat rail while the locking device is unlocked;
   a seat cushion carrier mounted for moving with the second seat rail relative to the first seat rail;
   a seat back mounted for moving with the second seat rail relative to the first seat rail;
   at least one adjustable fitting operatively associated with the seat back so that the seat back is pivotable relative to the seat cushion carrier, wherein
      (a) the seat back being pivotable relative to the seat cushion carrier comprises the seat back being pivotable to, and between, a plurality of positions, and
      (b) said plurality of positions includes at least
         (1) a use position, in which the seat back extends at least generally upright, and
         (2) a floor position, in which the seat back extends at least generally horizontally;
   at least one pivotable support member mounted
      (a) for at least partially supporting the seat cushion carrier, and
      (b) so that the pivotable support member moves into a first predetermined position relative to the second seat rail in response to the seat back being pivoted into a second predetermined position of said plurality of positions; and
   a responsive device that is operative for unlocking the locking device in response to the pivotable support member being moved into the second predetermined position relative to the second seat rail.

2. The vehicle seat according to claim 1, wherein the responsive device includes:
   a motion transmitter mounted for moving into a third predetermined position in response to the pivotable support member being moved into the first predetermined position;
   a release lever mounted so that the unlocking of the locking device occurs in response to the release lever being moved into a fourth predetermined position; and
   a pulling mechanism operatively connected between the motion transmitter and the release lever so that the release lever is moved into the fourth predetermined position in response to the motion transmitter being moved into the third predetermined position.

3. The vehicle seat according to claim 2, further comprising a release clip, wherein:
   the release clip is mounted for being manually actuated and thereby unlocking the locking device;
   the release clip includes a release arm; and
   the release arm is positioned between the release lever and the locking device, so that the unlocking of the locking device comprises the release lever acting on the locking device by way of the release arm.

4. The vehicle seat according to claim 3, wherein:
   the motion transmitter comprises a projection; and
   the projection is rotationally fixed with respect to the pivotable support member for rotating together with the pivotable support member around a pivotable axle.

5. The vehicle seat according to claim 4, wherein:
   the pulling mechanism is mounted to a mounting point of the projection, and
   the mounting point of the projection is spaced apart from the pivotable axle.

6. The vehicle seat according to claim 5, wherein:
   the second predetermined position of said plurality of positions is an intermediate position in which the seat back is located between the use position and the floor position;
   the projection is in a dead center position while the seat back is in the intermediate position;
   the mounting point is positioned in front of the pivotable axle while the projection is in the dead center position; and
   the pulling mechanism extends across the pivotable axle while the projection is in the dead center position.

7. The vehicle seat according to claim 2, wherein:
   the motion transmitter comprises a projection; and
   the projection is rotationally fixed with respect to the pivotable support member for rotating together with the pivotable support member around a pivotable axle.

8. The vehicle seat according to claim 7, wherein:
   the pulling mechanism is mounted to a mounting point of the projection, and
   the mounting point of the projection is spaced apart from the pivotable axle.

9. The vehicle seat according to claim 8, wherein:
   the second predetermined position of said plurality of positions is an intermediate position in which the seat back is located between the use position and the floor position;
   the projection is in a dead center position while the seat back is in the intermediate position;
   the mounting point is positioned in front of the pivotable axle while the projection is in the dead center position; and
   the pulling mechanism extends across the pivotable axle while the projection is in the dead center position.

10. The vehicle seat according to claim 9, wherein:
    the seat cushion carrier includes a front end and a rear end that is opposite from the front end;
    the pivotable support member is closer to the front end of the seat cushion carrier than to the rear end of the seat cushion carrier; and
    the adjustable fitting is closer to the rear end of the seat cushion carrier than to the front end of the seat cushion carrier.

11. The vehicle seat according to claim 8, wherein:
the seat cushion carrier includes a front end and a rear end that is opposite from the front end;
the pivotable support member is closer to the front end of the seat cushion carrier than to the rear end of the seat cushion carrier; and
the adjustable fitting is closer to the rear end of the seat cushion carrier than to the front end of the seat cushion carrier.

12. The vehicle seat according to claim 7, wherein:
the seat cushion carrier includes a front end and a rear end that is opposite from the front end;
the pivotable support member is closer to the front end of the seat cushion carrier than to the rear end of the seat cushion carrier; and
the adjustable fitting is closer to the rear end of the seat cushion carrier than to the front end of the seat cushion carrier.

13. The vehicle seat according to claim 2, wherein:
the seat cushion carrier includes a front end and a rear end that is opposite from the front end;
the pivotable support member is closer to the front end of the seat cushion carrier than to the rear end of the seat cushion carrier; and
the adjustable fitting is closer to the rear end of the seat cushion carrier than to the front end of the seat cushion carrier.

14. The vehicle seat according to claim 1, wherein:
the seat cushion carrier includes a front end and a rear end that is opposite from the front end;
the pivotable support member is closer to the front end of the seat cushion carrier than to the rear end of the seat cushion carrier; and
the adjustable fitting is closer to the rear end of the seat cushion carrier than to the front end of the seat cushion carrier.

15. A vehicle seat, comprising:
at least one first seat rail;
at least one second seat rail mounted for being moved relative to the first seat rail to adjust the vehicle seat's longitudinal position;
at least one locking device for
  (a) restricting the second seat rail from being moved relative to the first seat rail while the locking device is locked, and
  (b) allowing the second seat rail to be moved relative to the first seat rail while the locking device is unlocked;
a seat cushion carrier mounted for moving with the second seat rail relative to the first seat rail;
a seat back mounted for moving with the second seat rail relative to the first seat rail;
at least one adjustable fitting operatively associated with the seat back so that the seat back is pivotable relative to the seat cushion carrier, wherein
  (a) the seat back being pivotable relative to the seat cushion carrier comprises the seat back being pivotable to, and between, a plurality of positions, and
  (b) said plurality of positions includes at least
    (1) a use position, in which the seat back extends at least generally upright, and
    (2) a floor position, in which the seat back extends at least generally horizontally; and
at least one pivotable support member mounted
  (a) for at least partially supporting the seat cushion carrier,
  (b) so that pivoting of the pivotable support member at least partially adjusts the seat cushion carrier's height, and
  (c) so that the pivotable support member pivots into a first predetermined position relative to the second seat rail in response to the seat back being pivoted into a second predetermined position of said plurality of positions; and
a mechanical linkage operatively interposed between the pivotable support member and the locking device so that the locking device is unlocked in response to the pivotable support member being pivoted into the second predetermined position relative to the second seat rail.

16. The vehicle seat according to claim 15, wherein:
the seat cushion carrier includes a front end and a rear end that is opposite from the front end;
the pivotable support member is closer to the front end of the seat cushion carrier than to the rear end of the seat cushion carrier; and
the adjustable fitting is closer to the rear end of the seat cushion carrier than to the front end of the seat cushion carrier.

17. The vehicle seat according to claim 15, wherein the mechanical linkage includes:
a motion transmitter mounted for moving into a third predetermined position in response to the pivotable support member being pivoted into the first predetermined position;
a release lever mounted so that the unlocking of the locking device occurs in response to the release lever being moved into a fourth predetermined position; and
a pulling mechanism operatively connected between the motion transmitter and the release lever so that the release lever is moved into the fourth predetermined position in response to the motion transmitter being pivoted into the third predetermined position.

18. The vehicle seat according to claim 17, wherein:
the motion transmitter comprises a projection; and
the projection is rotationally fixed with respect to the pivotable support member for pivoting together with the pivotable support member around a pivotable axle.

19. The vehicle seat according to claim 18, wherein:
the pulling mechanism is mounted to a mounting point of the projection, and
the mounting point of the projection is spaced apart from the pivotable axle.

20. The vehicle seat according to claim 19, wherein:
the second predetermined position of said plurality of positions is an intermediate position in which the seat back is located between the use position and the floor position;
the projection is in a dead center position while the seat back is in the intermediate position;
the mounting point is positioned in front of the pivotable axle while the projection is in the dead center position; and
the pulling mechanism extends across the pivotable axle while the projection is in the dead center position.

* * * * *